United States Patent [19]

Zoppi

[11] 4,019,526
[45] Apr. 26, 1977

[54] DEVICE FOR SHUTTING OFF DAMAGED SECTIONS IN PNEUMATIC MULTI-SECTION BRAKING SYSTEMS FOR VEHICLES

[75] Inventor: Bruno Zoppi, Milan, Italy

[73] Assignee: Fabbrica Italiana Magneti Marelli, S.p.A., Milan, Italy

[22] Filed: Nov. 5, 1975

[21] Appl. No.: 629,072

[30] Foreign Application Priority Data

Nov. 15, 1974 Italy .................................. 29469/74

[52] U.S. Cl. .............................. 137/110; 303/84 R; 137/504
[51] Int. Cl.² .................. B60T 15/46; G05D 11/00
[58] Field of Search ............ 137/110, 498, 516.25, 137/516.27, 504; 303/84 R, 84 A

[56] References Cited

UNITED STATES PATENTS

| | | | |
|---|---|---|---|
| 2,201,523 | 5/1940 | Derrig | 137/498 X |
| 2,980,469 | 4/1961 | Stelzer | 303/84 R X |
| 3,173,446 | 3/1965 | Mitchell | 137/498 |
| 3,311,124 | 3/1967 | LeGates et al. | 137/110 |

*Primary Examiner*—William R. Cline

*Attorney, Agent, or Firm*—Ostrolenk, Faber, Gerb & Soffen

[57] ABSTRACT

A valve to shut off leakage from a damaged section of a pneumatic braking system: the valve comprises a spring biased movable shutter which is spring biased against a fixedly positioned annular seat and a second annular seat coaxial with the first annular seat; the second annular seat is spring biased to move a controlled maximum distance toward the shutter; a plenum defined between the first and second seats and the shutter; a small flow rate leakage passage from the high pressure concuit into the plenum. Pneumatic pressure enters the plenum and raises the shutter off the fixed valve seat while the movable valve seat follows the motion of the shutter and finally the shutter lifts off the movable valve seat, also; upon leakage, the shutter re-engages the movable and then the fixed valve seats. A valving assembly including the aforesaid valve plus other valves in the passages leading to the aforesaid valve, and each of these valves servicing a unit of the braking system.

9 Claims, 6 Drawing Figures

DEVICE FOR SHUTTING OFF DAMAGED SECTIONS IN PNEUMATIC MULTI-SECTION BRAKING SYSTEMS FOR VEHICLES

FIELD OF THE INVENTION

This invention relates to devices for shutting off damaged sections in pneumatic multi-section braking systems for vehicles.

BACKGROUND OF THE INVENTION

As well known, shutting off devices in said braking systems operate to shut off the damaged section or sections from the supply or power circuit, while allowing the compressor to supply the remaining undamaged sections.

Prior art shutting off valves are usually of the one seat type. When a section becomes damaged, air is continuously vented to atmosphere, which causes a pressure drop and oscillation in the tanks and other sections of the system, which is prejudicial to braking efficiency.

Devices are also known for avoiding the above mentioned disadvantage. Such devices use variable area valves, which provide a restricted passage area to the damaged section hindering at the recharging step the violent air flows from the undamaged sections. However, such approaches require an undue accuracy in clearance between the valve seat and plug and its effectiveness is substantially problematical.

It is another disadvantage of prior art valves that in a system provided with a plurality of shutting off valves, it would be substantially impossible to provide and maintain in time identical calibrations for all of the valves.

It may occur that, should the section controlled by the valve of lowest calibration become damaged, the entire flow from the compressor would escape from said damaged section, and the other sections could not be recharged.

SUMMARY OF THE INVENTION

It is the object of the present invention to avoid the above mentioned disadvantages in a safe, simple and effective manner.

A shutting off valve according to the invention is characterized by having two valve seats, one of which is stationary and the other of which has a minor diameter and is movable and the stroke of which is shorter than that of the plug. The body carrying the movable seat has a calibrated passage communicating between the inner chamber of the valve and an annular chamber defined by the two valve seats and plug.

The annular chamber forms a small plenum between the inner chamber of the valve connected to supply and section controlled by the valve, and can alternately provide for opening and closing the valve on the stationary seat. Thus, should the section fail or become damaged, the plenum would be directly intermittently connected with the damaged section and not the inner chamber of the valve, so that the latter and accordingly the tanks and undamaged sections of the system are not exposed to pressure drops and oscillations.

BRIEF DESCRIPTION OF THE DRAWINGS

The invention will now be described by way of example with reference to the accompanying drawings, in which.

DESCRIPTION OF A PREFERRED EMBODIMENT

Figure 1:
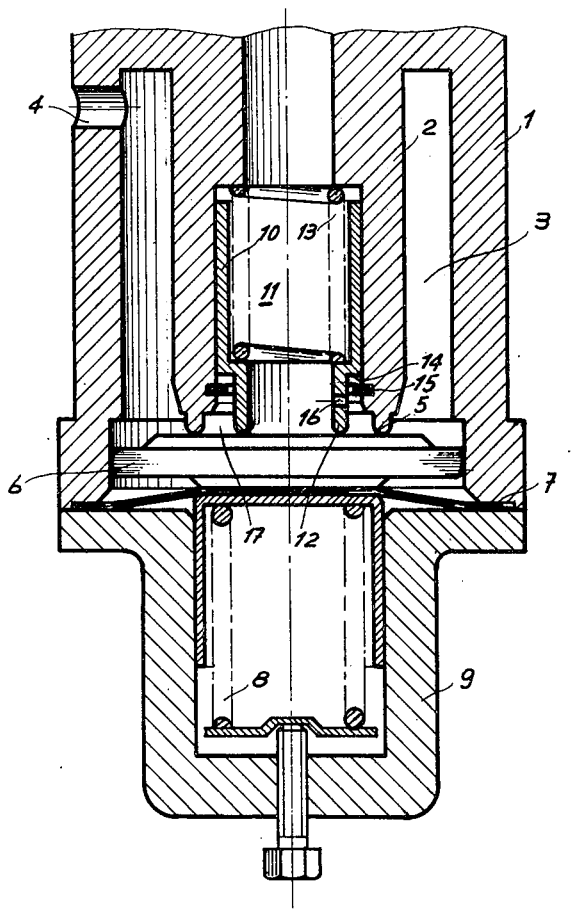
FIG. 1 is a longitudinal sectional view showing a double-seat valve according to the invention.

Referring to FIG. 1, a shutting off valve according to the invention comprises a body including two cylindrical parts 1 and 2, which between them define an annular chamber 3, the bore 4 is connected to the chamber 3 through part 1. The body 2 has the stationary valve seat 5 cooperating with plug or shutter 6. A return spring 8 biases shutter 6. A diaphragm 7 is interposed between shuter 6 and spring 8. The spring 8 is contained enclosed within a lid 9, which is sealed to body 1 and engages diaphragm 7.

There is an inner valve chamber. A movable cylindrical body 10 is housed within the inner valve chamber 11. The valve chamber communicates with the supply conduit of compressed air. The body 10 is axially slidable along the inner surface of stationary body 2. The body 10 includes at its end the movable valve seat 12. Seat 12 is concentric with stationary seat 5 and it also cooperates with plug or shutter 6.

Movable body 10 is normally biased toward shutter 6 by a spring 13. The stroke of body 10 is defined by an abutment 14 thereof that cooperates with a stop ring 15 carried by stationary body 2. The stroke of body 10 is shorter than the maximum stroke of the plug or shutter 6.

Adjacent the valve seat 12, said movable body has a calibrated hole 16 of a small size. This hole communicates said inner valve chamber 11 with an annular chamber 17 that is defined by and between the end portion of bodies 2 and 10 and plug or shutter 6.

Figures 2A, 2B, 2C:
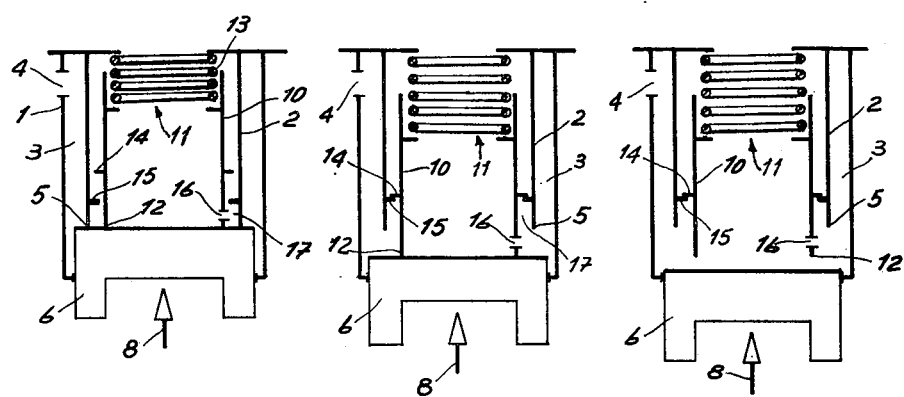
FIGS. 2a, 2b, and 2c are schematic views showing the valve at several operating steps.

FIG. 2a corresponding to FIG. 1 shows the valve at completely closed condition, at which said plug or shutter 6 sealingly bears on both the stationary outer seat 5 and the movable inner seat 12. FIG. 2b shows the same valve at a partially open condition, at which said shutter or plug is separated from the stationary outer seat 5, but still sealingly bears on the movable inner seat 12, which seat has moved with its body 10 to stay with plug 6. FIG. 2c shows the valve at the completely open condition, at which the plug or shutter 6 is separated from both seats 5 and 12.

The operation of the shutting off valve according to the invention is as follows:

Compressed air is introduced into chamber 11 and through calibrated hole 16 also into annular chamber 17 which, due to low pressure, is initially closed by plug or shutter 6, which is contacting both of said valve seats 5 and 12 (see FIG. 2a).

Upon pressure increase in chambers 11 and 17, the pneumatic action on said plug or shutter 6, and particularly on its useful area defined inside stationary seat 5, then against the bias of spring 8, said plug or shutter 6 will first separate from stationary seat 5. Then, as movable body 10 reaches the end of its stroke under the urging of spring 13, shutter 6 also separates from movable seat 12. Therefore, chamber 3 is first supplied only through hole 16 (see FIG. 2b) and later also through the passage area between said plug or shutter 6 and the movable seat 12 (see FIG. 2c).

The position shown in FIG. 2c is the position taken by the valve when chamber 11 is under pressure and the section that is controlled by such a chamber, and terminating at hole or bore 4, is operating efficiently.

Should failure or breakage occur to the section connected at 4, pressure within chamber 3 would rapidly drop, causing a reduction in the pneumatic thrust or bias on said plug or shutter 6. This would accordingly cause the plug to close on movable seat 12 due to the prevailing effect of spring 8 (see FIG. 2b).

Thus, the air escape from the damaged section would be shut off. However, a small amount of air would continue to escape through said calibrated hole 16. But since the flow rate flowing through the passage area between seat 5 and plug or shutter 6 is larger than that flowing through said hole 16 the pressure within annular chamber 17 rapidly drops and plug or shutter 6 also closes on seat 5.

As a result, the pressure within chamber 11 and 17 beings to rise again. When the pneumatic action on plug or shutter 6 prevails over the effect of spring 8, said plug or shutter separates from seat 5 (see FIG. 2b). But, owing to rapid pressure drop within chamber 17, as above discussed, the plug or shutter 6 immediately contacts said seat 5 (see FIG. 2a), without separating from movable seat 12.

These alternate stages, shown by positions 2a-2b-2a, are repeated whenever a sufficient pressure is resettled to raise said plug or shutter 6 from seat 5.

It will be apparent from the foregoing that, should a breakage occur to the section connected at 4, air escape would occur intermittently and only through calibrated hole 16. As a result, although the supply rate for chamber 11 is larger than the escape rate, pressure in said chamber 11, and accordingly in the system tanks connected thereto, would not undergo sudden drops and oscillations, because chamber 17 operates as a plenum between said chambers 3 and 11.

Furthermore, said pressure may reach quite a higher rate than the calibration rate of the valve. This is highly significant, particularly where the system sections controlled by such valves are two or more in number and are parallel supplied.

Thus, in such a case, the disadvantage of prior art devices is avoided, namely that of a restricted range of calibration rates for the parallel section valves and particularly that of not ensuring such calibrations in time.

A particular application of the valve according to the invention will now be described with reference to FIGS. 3 and 4.

Figure 3:
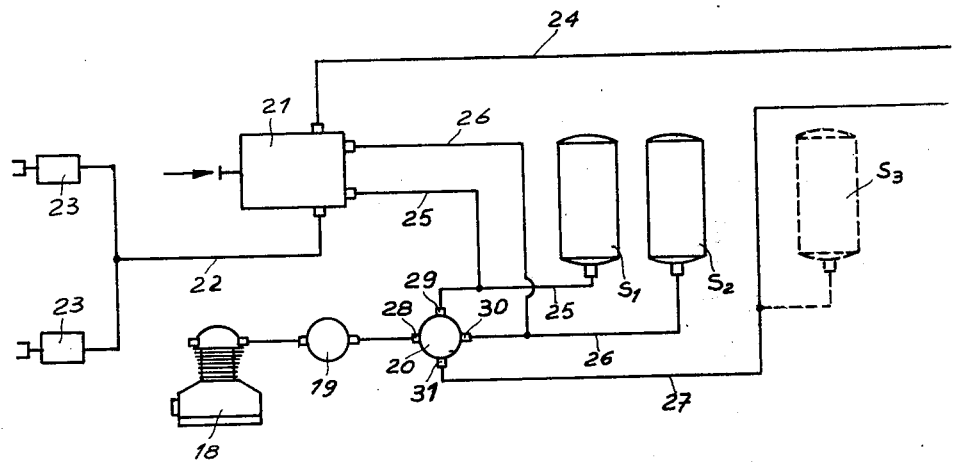
FIG. 3 is a diagrammatic view showing a pneumatic braking system provided with a shutting off valve unit for the damaged sections.

The pneumatic system shown in FIG. 3 includes a compressor 18, a regulator 19, a shutting off valve assembly 20, and a distributor 21 controlling through conduit 22 the braking elements 23 for the front vehicle axle, and through conduit 24 the rear braking elements of the vehicle, whereas $S_1$, $S_2$ and $S_3$ designate the compressed air tanks. Tank $S_1$, conduits 22 and 25 and braking elements 23 make up the braking section for the front axle. Tank $S_2$ and conduits 26 and 24, along with the associated braking elements, make up the braking section for the rear axle or axles.

Conduit 27, with or without tank $S_3$, and associated users, make up a third section of the system. For example, this third section may be used for trailer braking, spring brake control, and so on.

Shutting off assembly 20 is connected through coupling 28 to regulator 19 and through couplings 29, 30 and 31 to the three sections, respectively.

Figure 4:
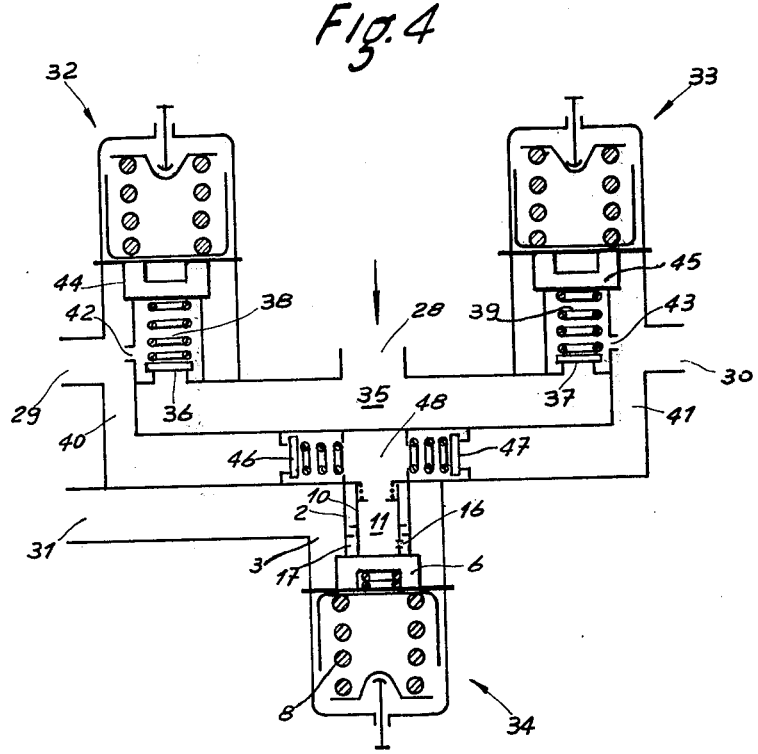
FIG. 4 is a schematic diagram of the valve unit shown in FIG. 3, using a shutting off valve according to the invention for controlling the interlocked section.

In the embodiment shown in FIG. 4, this assembly, which is also a subject of the present invention, comprises three shutting off valves 32, 33 and 34, the first two of which are conventional valves for controlling the braking sections of the vehicle front and rear axles, respectively, whereas the third valve, as derived from the first two valves and in accordance with the invention, is for controlling the third or interlocked section.

In operation, compressed air from regulator 19 is introduced through coupling 28 into chamber 35 of shutting off assembly 20 (see FIG. 4) and therefrom reaches through check valves 36 and 37 chambers 38 and 39 of valves 32 and 33, respectively. Then, the air enters chambers 40 and 41 first only through holes 42 and 43, and then also through the passage area defined by the opening of plugs or shutters 44 and 45.

From chambers 40 and 41 and through couplings 29 and 30 said air arrives at the respective sections, and through check valves 46 and 47 at chamber 48, the latter communicating with chamber 11 of valve 34. Now, the operation of the valve is as above discussed. Of course, such advantages as described in connection with the valve shown in FIG. 1 are applicable to shutting off assemblies comprising one or more valves according to the invention. These advantages are then apparent in a system, such as that shown in FIG. 3, using the valving unit of FIG. 4, since, should a failure occur in the interlocked section connected at 31 to valve 34, no pressure drops would be found in tanks $S_1$ and $S_2$ supplying the main braking sections of the vehicle.

Of course, where two or more derived or bypassed sections are concerned, the assembly is provided with two or more shutting off valves, such as 34, of which the chambers 11 communicate with the common chamber 48. Also valves 32 and 33 controlling the main sections could be made as valve 34.

What is claimed is:

1. A shutting off valve for a pneumatic braking system, particularly for shutting off damaged sections of the system, said valve comprising:

A first body; said first body having a first base; a first valve seat being defined on said first base; an opening in said first body extending inwardly from said first base;

a second body located in said opening in said first body; said second body being movable through said opening with respect to said first body; said second body having a respective second base that faces the same direction as said first base; a second valve seat being defined on said second base; said second body being movable through said opening and toward a shutter up to a first maximum distance; a flow path defined through said second body providing communication between said opening and said second valve seat;

a shutter located in opposed relation to both of said first and said second valve seats; means biasing said shutter toward engagement with said valve seats; said shutter being movable away from said bases through a distance greater than said first maximum distance;

said first and said second valve seats being spaced apart; said first and said second valve seats being shaped to define an enclosed plenum chamber between said valve seats; said plenum chamber being further defined by and communicating with said shutter;

said opening being connectible with a source of pneumatic fluid under pressure and said flow path; a calibrating, pressure transmitting passage through said second body communicating between said opening in said first body and said plenum chamber.

2. The shutting off valve of claim 1, further comprising a second biasing means in engagement with said second body for biasing it toward said shutter; abutment means positioned in said opening for engaging said second body to block further motion thereof toward said shutter after said second body has moved through said opening said first maximum distance.

3. The shutting off valve of claim 2, wherein said first body is cylindrical and is outside said second body; said opening and said second body being cylindrical and being inside said first body; said first and second bodies being concentric; said first and second valve seats being radially spaced apart and said plenum chamber being an annular chamber between said first and second valve seats.

4. The shutting off valve of claim 3, wherein said opening in said first body is a central opening generally centrally located on said first body, whereby said bodies are concentric.

5. The shutting off valve of claim 4, wherein said second body is hollow.

6. A valving assembly including a shutting off valve for a pneumatic vehicle braking system, comprising:

a shutting off valve according to claim 2;
a first passage; said shutting off valve communicating with said first passage;
a second passage;
a second valve interposed in and joining said first and said second passages; said second valve including closing means normally closing said second valve to block communications between said first and said second passages; said closing means being openable to permit said second valve to open upon application of pneumatic pressure in said second passage, thereby to enable communication between said first and said second passages;
said second passage including means connectible with a source of pneumatic fluid under pressure.

7. The valving assembly of claim 6, wherein said first passage is connectible with a first outlet leading to one set of braking elements;
with said shutter off of both of said valve seats, said plenum chamber being connectible with a second outlet leading to a second set of braking elements.

8. The valving assembly of claim 7, further comprising a third passage separate from said first and second passages;
A fourth passage;
A third valve interposed in and joining said third and said fourth passages; said third valve including closing means normally closing said third valve to block communication between said third and said fourth passages; said closing means being openable to permit said third valve to open upon application of pneumatic pressure in said fourth passage, thereby to enable communication between said third and said fourth passages;
said fourth passage including means connectible with a source of pneumatic fluid under pressure;
said third passage being connectible with a third outlet leading to a third set of braking elements.

9. The valving assembly of claim 6, wherein said second valve has a second central chamber; a pressure-responsive check valve communicating with said second passage and with the source of pneumatic pressure, said check valve to be opened by the pneumatic pressure to permit entry of pneumatic pressure into said second chamber;
a first outlet from said second chamber; a plug spring biased to normally close said second chamber first outlet;
a second permanently open calibrating outlet from said second chamber;
both said second chamber outlets communicating to said first passage toward said shutting off valve.

* * * * *